US009866716B2

(12) United States Patent
Oyasato (10) Patent No.: US 9,866,716 B2
(45) Date of Patent: Jan. 9, 2018

(54) IMAGE FORMING APPARATUS THAT DETERMINES A MOVEMENT DESTINATION OF DATA (71) Applicant: KYOCERA Document Solutions Inc., Osaka (JP)

(72) Inventor: Tomoki Oyasato, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/227,917

(22) Filed: Aug. 3, 2016

(65) Prior Publication Data
US 2017/0041487 A1 Feb. 9, 2017

(30) Foreign Application Priority Data

Aug. 3, 2015 (JP) .................. 2015-153409

(51) Int. Cl.
G06K 15/00 (2006.01)
H04N 1/00 (2006.01)
H04N 1/32 (2006.01)
G06F 3/06 (2006.01)

(52) U.S. Cl.
CPC ..... *H04N 1/00965* (2013.01); *H04N 1/32443* (2013.01); *G06F 3/068* (2013.01); *G06F 3/0646* (2013.01); *G06F 3/0647* (2013.01); *G06F 3/0683* (2013.01); *G06F 3/0685* (2013.01); *G06F 2212/205* (2013.01); *G06F 2212/217* (2013.01); *H04N 2201/0094* (2013.01)

(58) Field of Classification Search
None
See application file for complete search history.

(56) References Cited

U.S. PATENT DOCUMENTS

| 6,502,165 B1* | 12/2002 | Kishi | G06F 17/30011 |
| | | | 707/E17.008 |
| 8,949,483 B1* | 2/2015 | Martin | G06F 3/0653 |
| | | | 710/15 |
| 9,665,288 B1* | 5/2017 | Aharoni | G06F 3/061 |
| 2006/0092477 A1* | 5/2006 | Okado | H04N 1/409 |
| | | | 358/448 |
| 2007/0067683 A1* | 3/2007 | Yamanaka | G06K 15/00 |
| | | | 714/100 |
| 2008/0297812 A1* | 12/2008 | Watanabe | H04N 1/00411 |
| | | | 358/1.9 |
| 2010/0036810 A1* | 2/2010 | Wu | G06F 11/3495 |
| | | | 707/706 |
| 2010/0106479 A1* | 4/2010 | Hieda | G06F 9/455 |
| | | | 703/26 |

(Continued)

FOREIGN PATENT DOCUMENTS

JP 2014-199596 A 10/2014

*Primary Examiner* — Miya J Williams
(74) *Attorney, Agent, or Firm* — Hawaii Patent Services; Nathaniel K. Fedde; Kenton N. Fedde (57) ABSTRACT Provided is an image forming apparatus performing effective automated storage tiering. When the system control part of the CPU causes the image processing part to perform image processing of data read from the SSD having a processing speed higher than that of the HDD, the tiering control part measures a ratio of an idle time by the image processing relative to a usage ratio per unit time of the CPU, and determines a movement destination of the data.

4 Claims, 5 Drawing Sheets

(56) References Cited

U.S. PATENT DOCUMENTS

| | | | |
|---|---|---|---|
| 2012/0047318 A1* | 2/2012 | Yoon | G06F 3/0613 |
| | | | 711/103 |
| 2012/0254443 A1* | 10/2012 | Ueda | H04L 67/1008 |
| | | | 709/226 |
| 2014/0118795 A1* | 5/2014 | Kusumoto | H04N 1/00018 |
| | | | 358/406 |
| 2014/0160522 A1* | 6/2014 | Kawasaki | G06F 3/1213 |
| | | | 358/1.15 |
| 2014/0185099 A1* | 7/2014 | Araya | G06K 15/401 |
| | | | 358/1.16 |
| 2014/0268202 A1* | 9/2014 | Tanimoto | H04N 1/40 |
| | | | 358/1.13 |
| 2016/0077988 A1* | 3/2016 | Tipton | G06F 13/28 |
| | | | 710/308 |
| 2016/0162369 A1* | 6/2016 | Ahn | G06F 11/1461 |
| | | | 707/654 |
| 2016/0259594 A1* | 9/2016 | Takahashi | G06F 3/0619 |
| 2016/0350021 A1* | 12/2016 | Matsushita | G06F 12/0873 |

* cited by examiner

IMAGE FORMING APPARATUS THAT DETERMINES A MOVEMENT DESTINATION OF DATA

INCORPORATION BY REFERENCE

This application is based on and claims the benefit of priority from Japanese Patent Application No. 2015-153409 filed on Aug. 3, 2015, the entire contents of that are hereby incorporated by reference.

BACKGROUND

The present disclosure relates to an image forming apparatus for performing image formation.

As an image forming apparatus for performing image formation, it has been known a MFP (Multifunction Peripheral) such as a multifunction printer and a multifunction machine.

Memory devices such as a HDD (Hard Disk Drive) having a large capacity and a SSD (Solid State Drive) having a processing speed higher than the HDD can be mounted on the image forming apparatus. These memory devices are preferably used based on the purpose of use.

As one example thereof, the automated storage tiering technology is generally used. This is a technology in which it monitors access frequency (number of times) of data, whose access speed is different, per unit time every data, and highly frequently accessed data is moved to the SSD having a high processing speed.

Here, focusing on data which is subject to frequent reallocation between a memory device having a high processing speed and a memory device having a low processing speed. A frequent data movement is taken place even though only a small change occurs in an access speed (access performance) actually required for the data. For that reason, a load for the data movement processing becomes larger.

In a typical data processing program, when performing data movement between the tiering memory areas, an index value of data stored in the tiered memory area is acquired, based on a reallocation condition corresponding to a preset access frequency (number of times). Then, the feasibility of the data movement is determined based on the acquired index value.

SUMMARY

According to one aspect of the present disclosure, the image forming apparatus includes a first memory device that stores data; a second memory device that has a processing speed higher than that of the first memory device; and a processor that executes an information processing program. When the information processing program is executed, the processor operates to perform image processing of data read from the first memory device or the second memory device, control at least reading of the data, measure a ratio of an idle time by the image processing relative to a usage ratio per unit time of the processor, and determine a movement destination of the data.

DETAILED DESCRIPTION

Hereinafter, one embodiment of the image forming apparatus of the present disclosure is described with reference to the FIGS. 1 to 4.

Supposing here that as one example of the image forming apparatus in the following description is, for example, a MFP (Multifunction Peripheral) that is a composite peripheral equipment equipped with a print function, a copy function, a FAX function, a data transmission and reception function via a network, and a box function.

Figure 1:
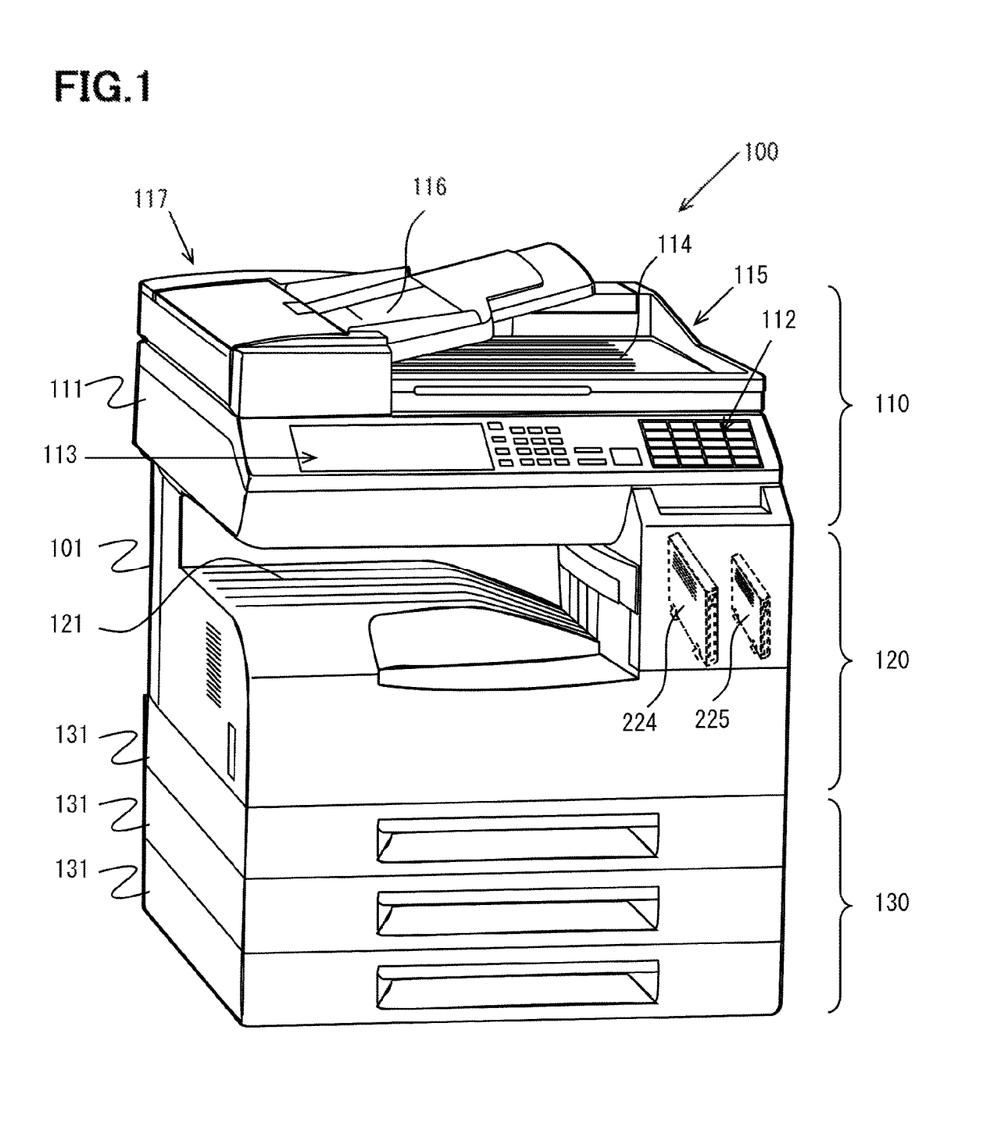
FIG. 1 shows an overview of a MFP according to one embodiment when an image forming apparatus of the present disclosure is applied to the MFP.

A description will be given first to an overview of the MFP with reference to FIG. 1. MFP 100 is provided with a reading part 110 in an upper part of the MFP main body 101. In a lower part of the reading part 110, there is provided an image forming part 120 and a paper feeding part 130.

A flatbed part 111 is provided in the reading part 110. On the side of flatbed part 111, there are provided a button operation part 112 and a panel part 113 on which a user can a touch operation. On an upper part of the flat bed part 111, there is provided a document platen made of transparent glass (not shown).

Also, on the upper part of the flatbed part 111, there are provided a cover 115 having a paper discharging tray 114, and an automatic paper feeder (hereinbelow referred to as an ADF) 117 having a paper feeding tray 116. The cover 115 and the ADF 117 are integrated. Further, the cover 115 and the ADF 117 are attached to the flatbed part 111 so that they open and close with a back side as a fulcrum. Then, when the cover 115 and the ADF 117 are opened, a document platen on an upper surface of the flatbed part 111 is exposed.

In a lower part of the document platen, there is arranged a scanner part 220. The scanner part 220 reads an image of a document while moving from the left to the right directions in FIGS when the document is set on the document platen. Note that the scanner part 220 is to be described later. When the document is set on the paper feeding tray 116 of the ADF 117, the ADF 117 draws the document one by one on the paper feeding tray 116, passes through the document on the scanner part 220 positioned below, and discharges the document into the paper discharging tray 114 of the cover 115. At this time, the scanner part 220 positioned below the ADF 117 reads an image of the document.

There is provided in the image forming part 120 a drum-type photoreceptor for forming an electrostatic latent image on a paper. Further, there is provided in the image forming part 120 a paper discharging tray 121 for discharging the document on which the electrostatic latent image is formed. In the image forming part 120, there are mounted a HDD (Hard Disk Drive) (first memory device) 224 having a large capacity and a SSD (Solid State Drive) (second memory device) 225 having a reading and writing processing speed of data higher than that of the HDD 224. There is provided an opening and closing cover in the image forming part 120, and the HDD 224 and the SSD 225 can be taken out by opening the opening and closing cover. Note that illustration of the opening and closing cover is omitted.

There are provided a plurality of paper feeding cassettes 131 in the paper feeding part 130. Each of the paper feeding cassettes 131 can store a plurality of paper sheets having a different size and a kind. When performing printing and copying, a paper in the specified paper feeding cassette 131 is fed to the image forming part 120 side through a conveying roller (not shown) by specifying the paper feeding cassette 131. Then, the paper on which the electrostatic latent image is formed by the image forming part 120 is discharged into the discharging tray 121.

Next, a description will be made to one example of an internal configuration of the MFP 100 with reference to FIG. 2. The MFP 100 includes a control part 200, a scanner part 220, a printer part 221, a FAX part 222, a panel part 113, a HDD 224, and a SSD 225.

The scanner part 220 is a device that reads a document (not shown), converts an image signal of the document into digital image data, and inputs to the control part 200. At that time, the scanner 220 reads the document by an image sensor (not shown).

The printer part 221 is a device that prints an image on a paper based on the image data output from the control part 200. The FAX part 222 is a device that transmits the image data output from the control part 200 to a facsimile that is a destination via a telephone line, receives the image data from the destination facsimile and inputs the image data to the control part 200.

The panel part 113 is a device that performs selection of one of a print function, a copy function, a FAX function, a data transmission, reception function via a network and a box function of the MFP 100, and displays for various settings.

The HDD 224 is a device that stores an application program or the like for providing a variety of functions of the MFP 100. The HDD 224 has a plurality of partitions. Each of the partitions is divided into an OS (Operating System) image, an installed application program, image data handling, and a user box to store a user file, or the like.

The SSD 225 is a memory device having a little capacity than that of the HDD 224, but has a faster reading and writing processing speed. The SSD 225 may have a plurality of partitions, as with the HDD 224. In this case, each of the partitions can be divided into an OS (Operating System) image, an installed application program, image data handling, and a user box to store a user file, or the like. Note that it may be either the HDD 224 or the SSD 225 to boot the OS but it is often the case that the OS of the HDD 224 is preferentially set. Alternatively, it is also possible to use a USB memory and a SD card instead of the SSD 225. Nonetheless, considering the automated storage tiering, it needs to establish the environment (permanent environment) where they are not freely insertable and removable.

The control part 200 is a processor that controls the whole operation of the MFP 200 by executing an image forming program and the other control program. The control part 200 includes a scanner control part 201, a printer control part 202, a FAX (Facsimile) control part 203, a network control part 204, a RAM (Random Access Memory) 205, an EEPROM (Electrically Erasable Programmable Read-Only Memory) 206, a panel operation control part 207, an image processing part 208, a tiering control part 209, a HDD control part 210, a SSD control part 211, and a system control part 212. These parts are connected to the system control part 212 via a data bus 213.

Figure 2:
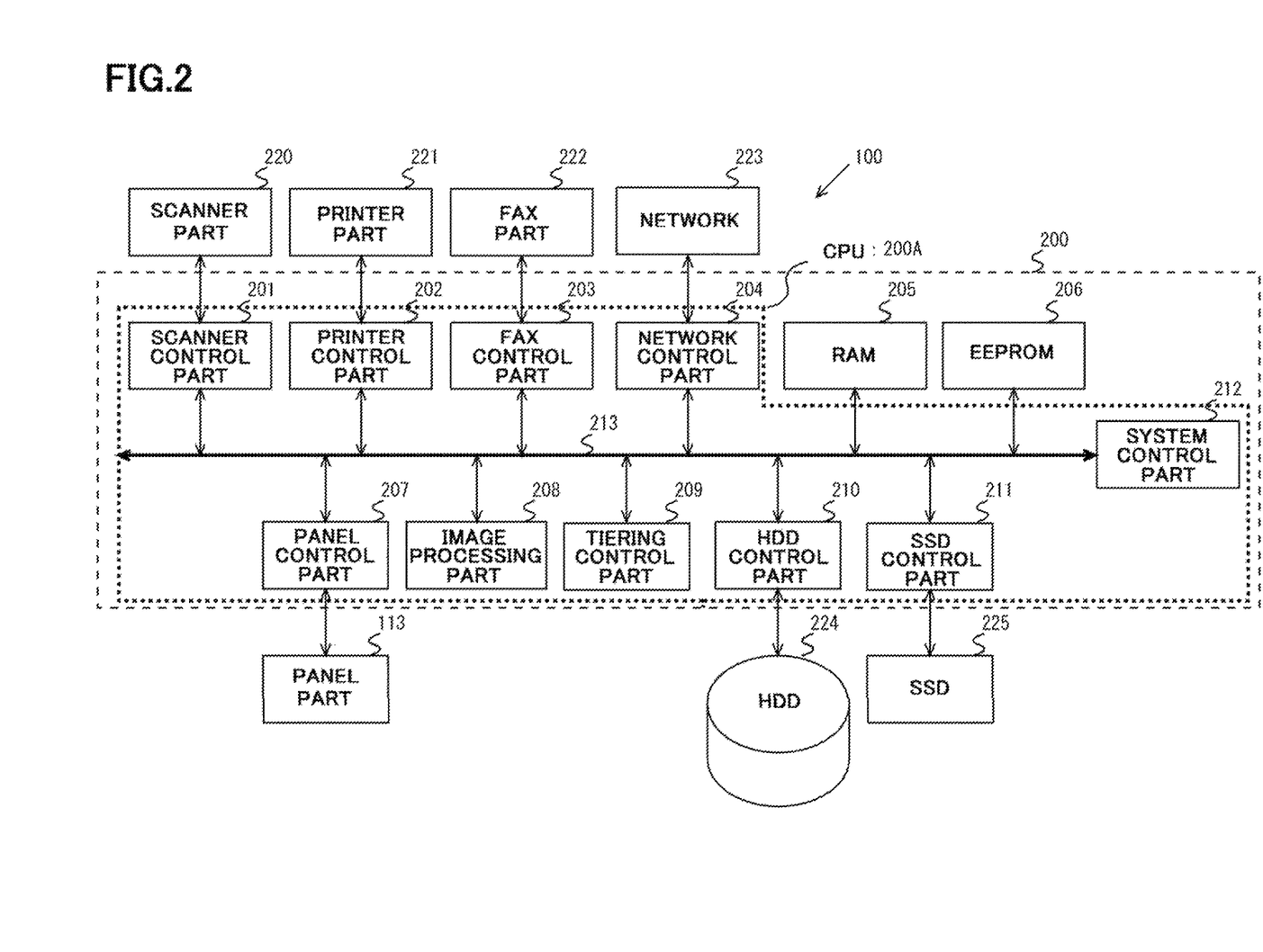
FIG. 2 is shows an internal configuration of the MFP shown in FIG. 1.

As shown encircling by a dotted line in FIG. 2, the scanner control part 201, the printer control part 202, the FAX control part 203, the network control part 204, the panel operation control part 207, the image processing part 208, the tiering control part 209, the HDD control part 210, the SDD control part 211, and the system control part 212 constitute the CPU 200A.

The scanner control part 201 controls a reading operation of the scanner part 220. The printer control part 202 controls a printing operation of the printer part 221. The FAX control part 203 controls a transmitting and receiving operation of image data by the FAX part 222.

The network control part 204 performs transmitting and receiving control of data via the network 223 through an I/F (interface) (not shown).

The RAM 205 is a work memory that executes a control program and an application program to be described later. The EEPROM 206 stores a control program to perform an operation check of each part. Further, the EEPROM 115 stores log information on an operation executed by the application program.

The panel operation control part 207 controls a display operation of the panel part 113. The image processing part 208 performs image processing (rasterization) to the image data. The tiering control part 209 performs automated storage tiering to determine whether a data movement destination should be the HDD 224 or the SSD 225 based on a ratio of an idle time (no processing is performed) of the image processing by the image processing part 208. The details of the specific automated storage tiering will be described later.

The HDD control part 210 controls reading and writing from/to the HDD 224. The SSD control part 211 controls reading and writing from/to the SSD 225. The system control part 212 controls a coordinated operation of each part. Further, the system control part 212 performs control based on one of printing operation, the copying function, the FAX function, the data transmitting and receiving function via the network, and the box function of the MFP 100 from a user through the panel part 113. Note that selection of one of the print function, the copying function, the FAX function, the data transmitting and receiving function via the network, and the box function of the MFP 100 may be performed by using a portable terminal.

Figure 3A:
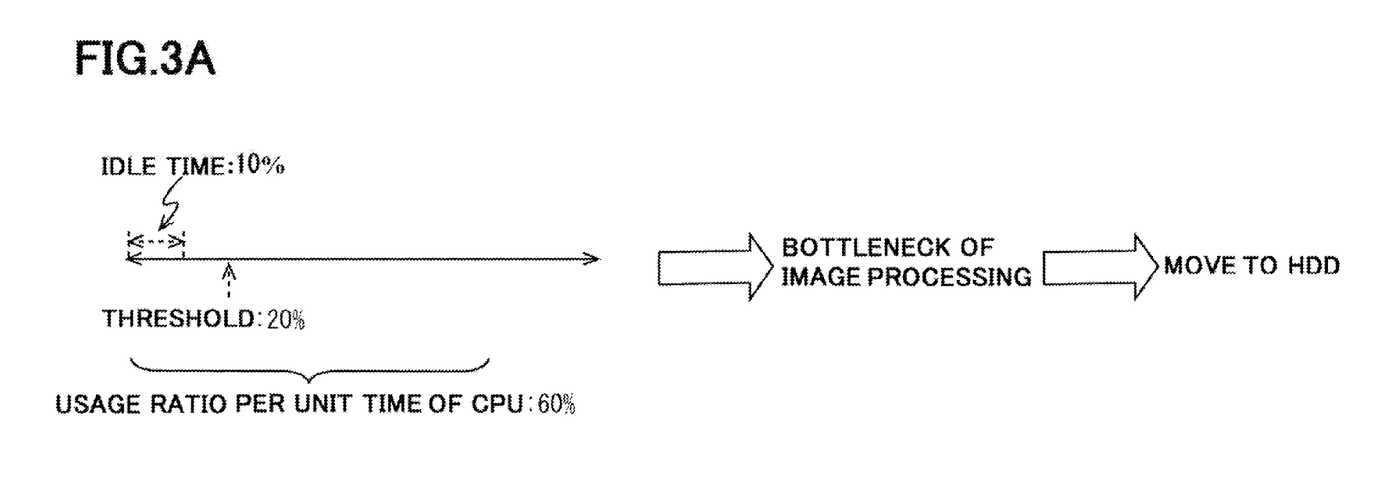
FIG. 3A shows one example of tiering control by a tiering control part shown in FIG. 2.
Figure 3B:
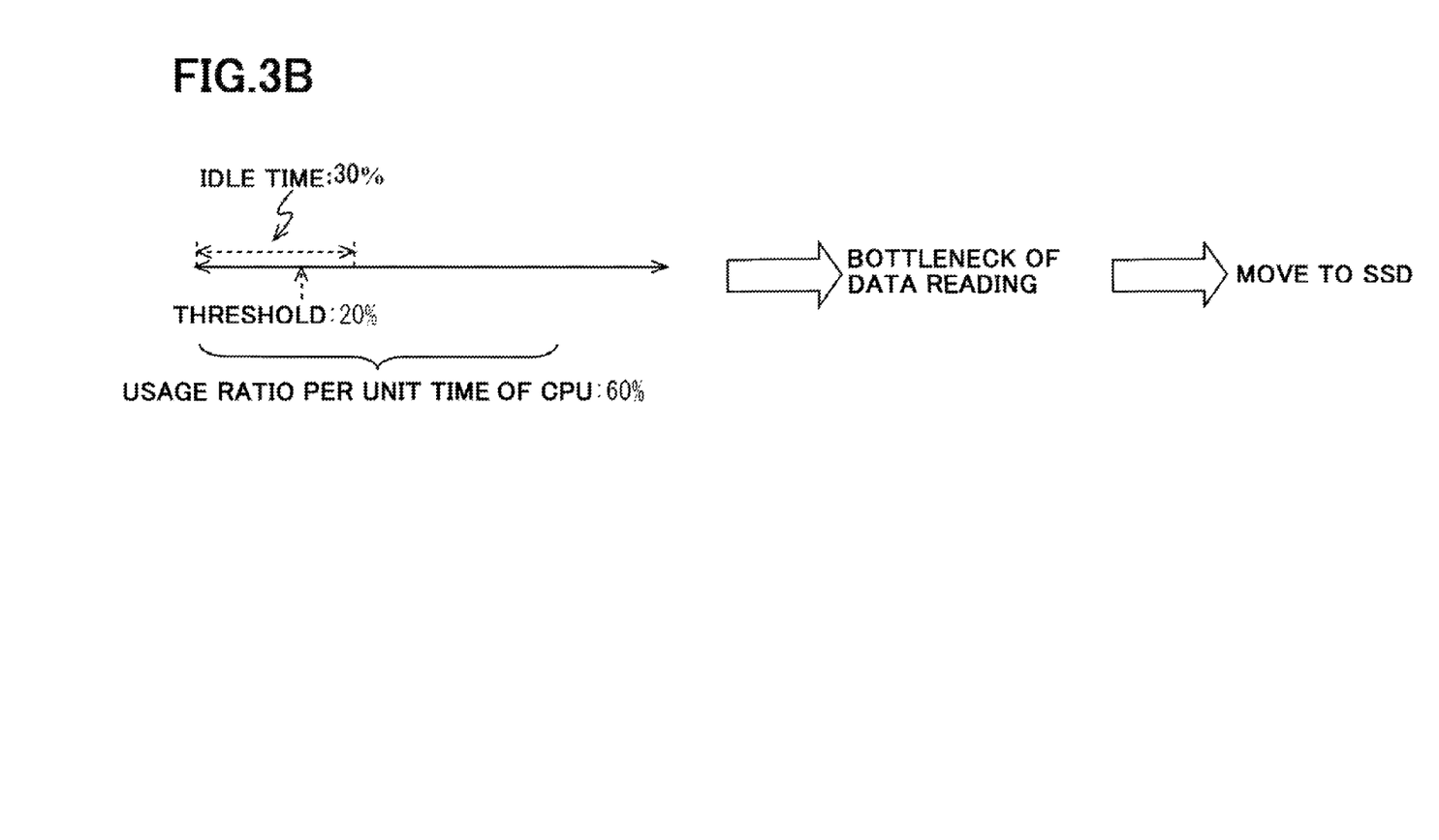
FIG. 3B shows one example of tiering control by a tiering control part shown in FIG. 2.

Next, a description is made to one example of tiering control by the tiering control part 209 with reference to FIGS. 3A and 3B.

The general tiering control aims at effectively exerting high performance by allocating data to which an access is gained at high frequency to a high speed (high processing speed) memory device. In contrast, the present embodiment focuses on the fact that it needs not necessarily to access at a high speed to data to which an access is gained at high frequency.

Namely, for example, supposing here that printing processing of a file stored in the user box is performed. In this case, a possible factor of lowering a printing processing speed includes a slow image processing speed by the image processing part 208 and slow data reading speed by the HDD control part 210. Among these, that which has a slower processing speed becomes a bottleneck.

Specifically, when the image processing by the image processing part 208 becomes a bottleneck, it cannot expect speedup of the print processing even by storing the data to which access is gained at high frequency in the SSD 225 that is a high speed memory device. This is because the image processing takes time for image processing and consequently the image processing time is not shortened even if a reading speed of the data from the SSD 225 is faster.

Then, the tiering control part 209 according to the present embodiment measures a ratio of an idle time (no processing is performed) in a case where a usage rate per unit time of the CPU 200A is, for example, set to 60%, as shown in FIG. 3A, during the printing process. The idle time here is a time during which the CPU 200A is in a stand-by state when image processing is performed by the image processing part 208. If the image processing becomes a bottleneck, a ratio of an idle time of the CPU 200A will decrease as a load of the image forming apparatus 208 becomes larger. Conversely, if the image processing does not become a bottleneck (that is, reading of the data becomes a bottleneck), a ratio of an idle time of the CPU 200A will increase as a load of processing of the image processing part 208 becomes smaller. Note that since a reading speed of the data depends on a processing capacity of the memory device, a load of the CPU 200A due to an operation of the HDD control part 210 or the SDD control part 211 is not changed.

The tiering control part 209 determines, as shown in FIG. 3A, that the image processing by the image processing part 208 becomes a bottleneck, if a ratio of the idle time (for example, 10%) is, for example, less than a threshold that is set to 20% relative to a usage rate per unit time of the CPU 200A. Then, the tiering control part 209 determines that the read data should be moved to the HDD 224. Here, if a data reading source and a data moving destination are the same, no movement of the data will be taken place. The details of this will be described later.

As shown in FIG. 3B, if a ratio of the idle time (for example, 30%) is, for example, more than a threshold that is set to 20% relative to a usage rate per unit time of the CPU 200A, the tiering control part 209 determines that reading of the data becomes a bottleneck. Then, the tiering control part 209 determines that the read data should be moved to the SSD 225. Here, if the data reading source and the data moving destination are the same as above, no movement of the data is taken place.

Figure 4:
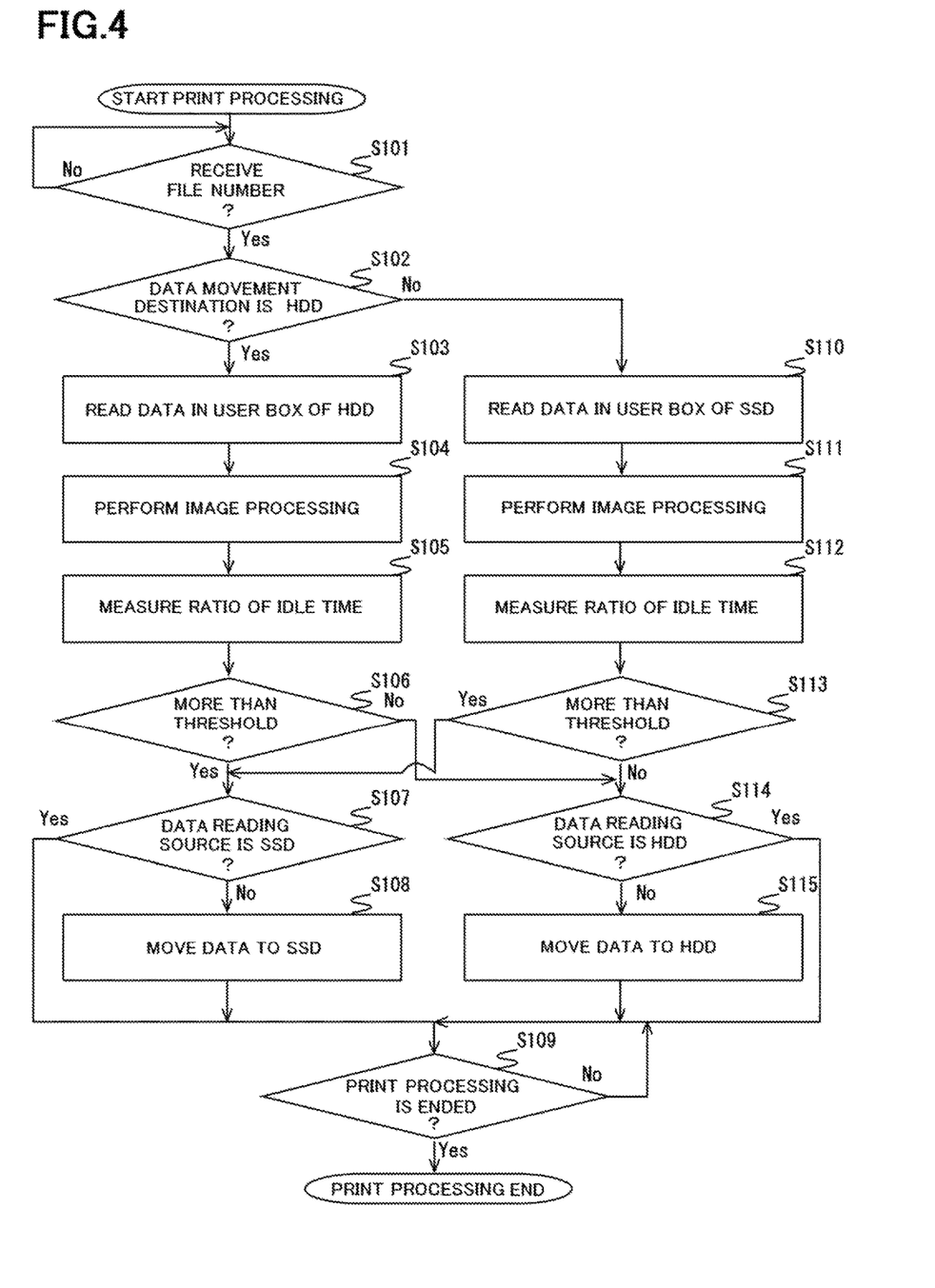
FIG. 4 shows steps of the automated storage tiering in the image forming apparatus shown in FIG. 1.

Next, a description is made to the automated storage tiering of the MFP 100 with reference to FIG. 4. Note that a description is given, in the following description, taking a case as an example where a plurality of files are stored in the user box of the HDD 224 and the SSD 225, and print processing is performed by reading one of the files. Here, supposing that when starting the print processing, a list of file numbers is displayed on the panel part 113. Alternatively, an input item of the file numbers may be displayed on the panel part 113. In this case, supposing that the print processing is started by operating a start button after selection or an input of any one of the file numbers. Further, as to whether the data corresponding to the file number is stored in either the HDD 224 or the SSD 225, supposing that the system control part 212 is in charge of management.

(Step S101)
The system control part 212 determines first whether or not a file number is received. In this case, the system control part 212 waits a notification from the panel operation control part 207 (step S101: No), and determines that the file number is received if the notification from the panel operation part 207 is received (step S101: Yes).

(Step S102)
The system control part 212 determines whether or not a storing destination of the data having the received file number is the HDD 224. If system control part 212 determines that the storing destination of the data having the received file number is the HDD 224 (step S102: Yes), processing of the system control part 212 proceeds to step S103. Otherwise, if the system control part 212 determines that the storing destination of the received file number is not the HDD 224 (step S102: No), processing of the system control part 212 proceeds to step S110.

(Step S103)
The system control part 212 reads the data corresponding to the file number from the user box of the HDD 224 through the HDD control part 210. The read data is stored in a work area of the RAM 205.

(Step S104)
The system control part 212 instructs the image processing part 208 to perform image processing (rasterization). Upon reception of the instruction, the image processing part 208 applies image processing (rasterization) to the data stored in the work memory of the RAM 205. When the image processing by the image processing part 208 is ended, the system control part 212 performs printing from the printer part 221 through the printer control part 202.

(Step S105)
The system control part 212 instructs the tiering control part 209 to perform tiering control. Upon reception of the instruction, the tiering control part 209 measures a ratio of an idle time of the CPU 200A in the process of the image by the image processing part 208.

(Step S106)
The tiering control part 209 determines whether or not the measured idle time of the CPU 200A is more than a threshold. Here, as shown in FIG. 3B, if the idle time is more than 30%, the tiering control part 209 determines that the idle time is more than the threshold that is set to 20% (step S106: Yes), processing of the tiering control part 209 proceeds to step S107. Otherwise, as shown in FIG. 3A, if the idle time is more than 10%, the tiering control part 209 determines that the idle time is not more than threshold that is set to 20% (step S106: No), processing of the tiering control part 209 proceeds to step S114.

(Step S107)
If the system control part 212 confirms the determination result that the idle time (30%) is determined by the tiering control part 209 is more than the threshold (20%), the system control part 212 determines whether or not that a data reading source is the SSD 225. If the data reading source is the SSD 225 (step S107: Yes), the processing of the system control part 212 proceeds to step S109. Otherwise, if the data reading source is not the SSD 225 (step 107: No), processing of the system control part proceeds to step S108.

(Step S108)
The system control part 212 moves the data read from the HDD 224 to the SSD 225. In this case, the system control part 212 erases the data stored in the user box of the HDD 224 through the HDD control part 210. This increases a memory capacity of the HDD 224 by the amount of the erased data.

(Step S109)
The system control part 212 determines whether or not the print processing is ended. Then, the system control part 212 waits for notification of an end of the print processing from the printer control part 202 (step S109: No). If the notification of the end of the print processing is received from the printer control part 202, the system control part 212 determines that the print processing is ended (step S109: Yes).

(Step S110)
The system control part 212 reads data corresponding to a file number from the user box of the SSD 225 through the SSD control part 21. The system control part 212 stores the read data in a work area of the RAM 205.

(Step S111)
The system control part 212 instructs the image processing part 208 to perform image processing (rasterization). Upon reception of the instruction, the image processing part 208 applies image processing (rasterization) to the data stored in the work area of the RAM 205. If the image processing by the image processing part 208 is ended, the system control part 212 performs printing from the printer 221 through the printer control part 202.

(Step S112)

The system control part 212 instructs the tiering control part 209 to perform tiering control. Upon reception of the instruction, the tiering control part 209 measures a ratio of an idle time of the image processing by the image processing part 208.

(Step S113)

The tiering control part 209 determines whether or not the measured idle time of the CPU 200A in the process of the image by the image processing part 208 is more than a threshold. Here, as shown in FIG. 3B, if the idle time is more than 30%, the tiering control part 209 determines that the idle time is more than the threshold that is set to 20% (step S113: Yes), processing of the tiering control part 209 proceeds to step S107. Otherwise, as shown in FIG. 3A, if the idle time is 10%, the tiering control part 209 determines that the idle time is not more than the threshold that is set to 20% (step S113: No), processing of the tiering control part 209 proceeds to step S114.

(Step S114)

If the system control part 212 confirms the determination result that the idle time (10%) measured by the tiering control part 209 is not more than the threshold (20%), the system control part 212 determines whether or not a reading source of data is the HDD 224. If the reading source of the data is the HDD 224, processing of the system control part 212 proceeds to step 109. Otherwise, if the reading source of the data is not the HDD 224 (step S114: No), processing of the system control part 212 proceeds to step S115.

(Step S115)

The system control part 212 moves the data read from the SSD 225 to the HDD 224. In this case, the system control part 212 erases the data stored in the SSD 225 through the SSD control part 211. After that, processing of the system control part 212 proceeds to step S109. This increases a memory capacity of the SSD 225 by the amount of the erased data.

Thus, in the present embodiment, the system control part 212 of the CPU 200A causes the image processing part 208 to perform image processing of the data read from the HDD 224 or SSD 225 having a higher processing speed compared with the HDD 224. After that, the tiering control part 209 measures a ratio of an idle time by the image processing part relative to a usage ratio per unit time of the CPU 200A, and determines a data movement destination.

Namely, if the ratio of the idle time is less than a specific threshold, the tiering control part 209 determines that a moving destination of the read data is the HDD 224, and if the ratio of the idle time is more than a specific threshold, the tiering control part 209 determines that a moving destination of the read data is the SSD 225. Then, the CPU 200A moves the data based on the determination result by the tiering control part 209.

At that time, if the data moving destination and the data reading source are the same, no movement of the data is taken place. As described in the above, according to the image forming apparatus of the present disclosure, the image forming apparatus allows effective automated storage tiering as it performs movement of the data based on a factor that invites lowering of a processing speed of the image forming apparatus.

It should be noted that, in the present embodiment, the description is made on the assumption that the print processing of the file stored in the user box is performed when performing the automated storage tiering, not necessarily limited to the example, a description may be made on the assumption that FAX processing of a file stored in the user box and data transmission processing via a network.

What is claimed is:

1. An image forming apparatus comprising:
   a first memory device that stores data;
   a second memory device that has a processing speed higher than that of the first memory device; and
   a processor that executes an information processing program,
   wherein when the information processing program is executed,
   the processor operates to:
   perform image processing of data read from the first memory device or the second memory device;
   control at least reading of the data;
   measure a ratio of an idle time when the image processing is performed relative to a usage rate per unit time of the processor; and
   determine a movement destination of the data,
   when the information processing program is executed, the processor further operates to:
   determine that the movement destination of the read data is the first memory device if the ratio of the idle time is less than a specific threshold;
   determine that the movement destination of the read data is the second memory device if the ratio of the idle time is more than the specific threshold; and
   move the data based on the determination result of the movement destination, wherein
   the specific threshold is set such that the ratio of the idle time is less than the specific threshold when image processing speed by the processor is slower than data reading speed by the processor.

2. The image forming apparatus according to claim 1, wherein when the information processing program is executed, the processor further operates not to move the data if the movement destination of the data and a reading source of the data are the same.

3. The image forming apparatus according to claim 1, wherein the ratio of the idle time decreases when a load of the image forming apparatus is large, and increases when the load of the image forming apparatus is small.

4. The image forming apparatus according to claim 1, wherein the processor, when executing the information processing program, erases the data stored in the first memory device when the movement destination of the read data is determined to be the second memory device, and erases the data stored in the second memory device when the movement destination of the read data is determined to be the first memory device.

* * * * *